(12) United States Patent
Diederich et al.

(10) Patent No.: US 10,276,134 B2
(45) Date of Patent: Apr. 30, 2019

(54) DECISION-BASED DATA COMPRESSION BY MEANS OF DEEP LEARNING TECHNOLOGIES

(71) Applicant: International Business Machines Corporation, Armonk, NY (US)

(72) Inventors: Michael Diederich, Mainz (DE); Thomas Doerk, Mainz (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/465,850

(22) Filed: Mar. 22, 2017

(65) Prior Publication Data

US 2018/0277068 A1    Sep. 27, 2018

(51) Int. Cl.
  *G09G 5/39*    (2006.01)
  *G06N 3/02*    (2006.01)

(52) U.S. Cl.
  CPC .............. *G09G 5/39* (2013.01); *G06N 3/02* (2013.01); *G09G 2340/02* (2013.01)

(58) Field of Classification Search
  CPC ...... G09G 2340/02; G09G 5/39; G09G 5/393; G06T 9/00; H04N 7/26707; G06N 99/005; G06N 5/025; G06N 7/005; G06N 3/08; G06N 3/04; G06K 9/6256; G06K 9/6269; G06F 17/30707
  See application file for complete search history.

(56) References Cited

U.S. PATENT DOCUMENTS

| | | | |
|---|---|---|---|
| 6,871,320 B1 * | 3/2005 | Morihara | H03M 7/3084 715/236 |
| 9,344,528 B2 | 5/2016 | Sliger et al. | |
| 2004/0236884 A1 | 11/2004 | Beetz | |
| 2005/0179692 A1 * | 8/2005 | Kumagai | G11B 27/031 345/555 |
| 2006/0038705 A1 * | 2/2006 | Brady | G06T 9/00 341/123 |
| 2007/0233477 A1 | 10/2007 | Halowani et al. | |
| 2010/0257174 A1 | 10/2010 | Minuti | |

(Continued)

FOREIGN PATENT DOCUMENTS

| | | |
|---|---|---|
| EP | 2961229 A1 | 12/2015 |
| RU | 2014147972 A | 6/2016 |

OTHER PUBLICATIONS

Alexa et al., "Lossless Data Compression Using Neural Networks", Proceedings of the 7th WSEAS International Conference on Circuits, Systems, Electronics, Control and Signal Processing (CSECS'08), ISBN: 978-960-474-035-2, 5 pages.

(Continued)

*Primary Examiner* — Todd Buttram
(74) *Attorney, Agent, or Firm* — Peter K. Suchecki

(57) ABSTRACT

Data may be handled based on compressibility (i.e., whether the data may be further compressed or is not further compressible). A supervised learning model may be trained using a set of known further compressible data and a set of known non-compressible data. Using these data sets, the model may generate weighting factors and bias for the particular data sets. The trained model may then be used to evaluate a set of unclassified data.

15 Claims, 8 Drawing Sheets

(56) References Cited

U.S. PATENT DOCUMENTS

| | | | |
|---|---|---|---|
| 2011/0225112 A1* | 9/2011 | Cameron | G06F 19/3456 |
| | | | 706/20 |
| 2014/0244604 A1 | 8/2014 | Oltean et al. | |
| 2016/0314140 A1 | 10/2016 | Gupta | |
| 2016/0344646 A1* | 11/2016 | Wang | H04L 47/38 |
| 2017/0344900 A1* | 11/2017 | Alzahrani | G06N 99/005 |
| 2018/0101768 A1* | 4/2018 | Laine | G06N 3/08 |
| 2018/0130180 A1* | 5/2018 | Wang | G06T 3/4053 |
| 2018/0150572 A1* | 5/2018 | Yates | G06Q 50/01 |
| 2018/0174047 A1* | 6/2018 | Bourdev | G06N 3/08 |

OTHER PUBLICATIONS

Yadav et al., "Image Compression and Reconstruction Using Artificial Neural Network", International Research Journal of Engineering and Technology (IRJET), vol. 03 Issue: 02, Feb. 2016, www.irjet.net, 5 pages.

Unknown, CS231n Convolutional Neural Networks for Visual Recognition, Google-Ergebnis, Printed Feb. 7, 2017, 1 page.

* cited by examiner

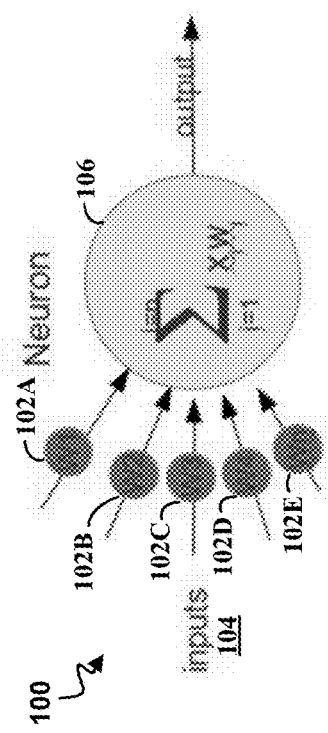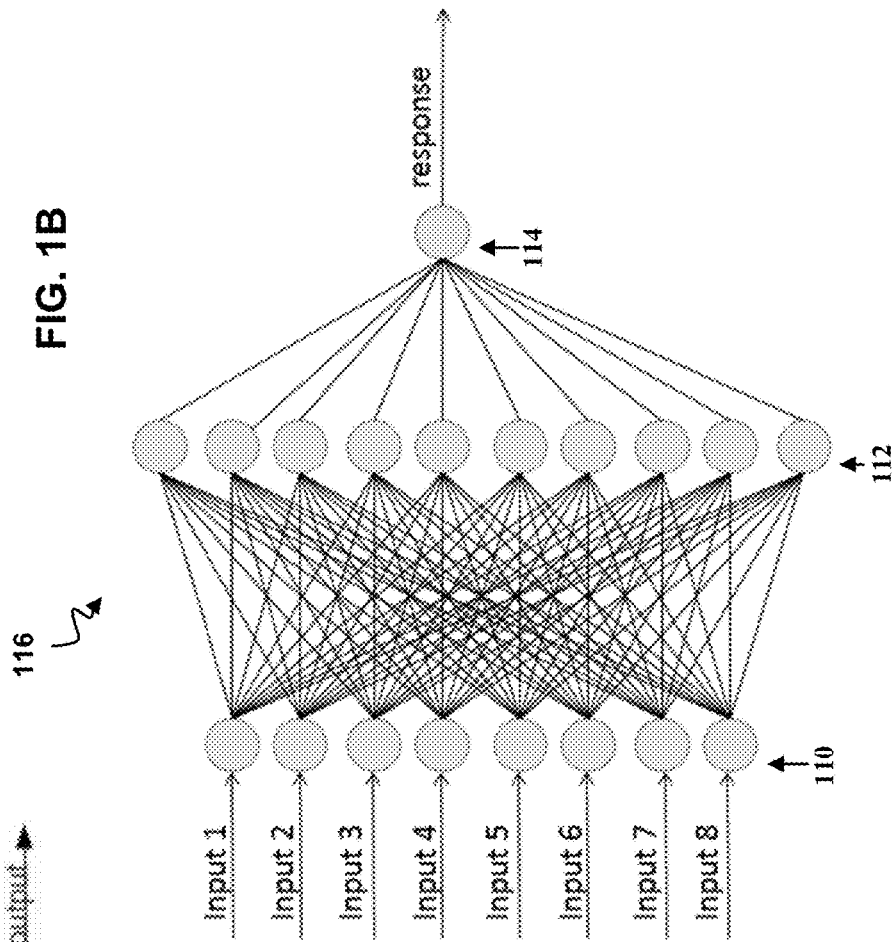

FIG. 4

400
402 response
404 input1, input2, input3, input4, input5, input6, input7, input8

500A

|  | input 1 | input 2 | input 3 | input 4 | input 5 | input 6 | input 7 | input 8 |
|---|---|---|---|---|---|---|---|---|
| 504→ | 0 | 0 | 0 | 1 | 1 | 0 | 1 | 1 |
|  | 1 | 1 | 0 | 0 | 0 | 1 | 1 | 0 |
|  | 1 | 1 | 1 | 0 | 0 | 1 | 0 | 0 |
|  | 0 | 1 | 0 | 1 | 0 | 1 | 0 | 1 |
|  | 0 | 1 | 0 | 1 | 1 | 0 | 1 | 0 |
|  | 1 | 1 | 1 | 1 | 1 | 1 | 1 | 1 |

502

500B

```
$net.result
            [,1]
[1,] 0.909205821055
[2,] 0.930674442906
[3,] 0.934111195080
[4,] 0.045338586638
[5,] 0.002516555078
[6,] 0.087456998178
```

1
1
1
0
0
0

DECISION-BASED DATA COMPRESSION BY MEANS OF DEEP LEARNING TECHNOLOGIES

BACKGROUND

The present disclosure relates to computer learning, and more specifically, to the application of computer learning to digital data compression.

An Artificial Neural Network (ANN) may be an information processing paradigm, inspired by the way the biological nervous system, from an individual neuron to a brain, processes information. An important element of the ANN paradigm is the structure of the information processing system. The system may be composed of a large number of highly interconnected processing elements (representing individual neurons in the biological model). These interconnected processing elements may work in unison to solve specific problems. ANNs may learn by example.

As the technological capacity for the creation, tracking, and retention of data continues to grow, data compression has developed as a technology for improving transmission and storage of the vast amounts of a data being created and shared. Data compression may allow for the reduction of data size by representing data differently. The data may be restored at a later time (for example, following transmission or recall from memory) for further processing. At times, the ability to select a compression technique and effectively perform a data compression may be limited by resource constraints, as data compression can be quite burdensome on a system's resources.

SUMMARY

Embodiments of the present disclosure may be directed toward a method for handling data based on compressibility. This system may perform pre-compression analysis on data, in order to determine whether or not the data can be further compressed. In instances where the data cannot be further compressed, the data may be rerouted directly to storage. Data that may be compressed or further compressed may be sent to data compression. This provides an advantage by decreasing wasted processing and memory resourced by providing for the reduction in storage hardware, data transmission time and communication bandwidth associated with data compression, without wasting resources attempting to compress data that is not further compressible.

The pre-compression analysis may be performed by a computer system using a supervised learning model, like an artificial neural network (ANN) that is trained with known sample data. The trained and validated model can then evaluate unclassified data, in order to determine if the data may or may not be further compressed. Based on the determination, the data may bypass compression (if it is not further compressible) or be sent to a data compressor (if further compressible).

Embodiments of the present disclosure may also be directed toward an improved computer system with at least one computer processing circuit the can perform pre-compression data analysis and direct data according to the analysis. Embodiments may also be directed toward a computer program product for similarly handling the data based on a supervised learning model-informed analysis. The computer program product may have program instructions embodied therewith and may not be a transitory signal per se. The program instructions may be executable by a computer processing circuit to perform a method, for example, the method described above.

Embodiments of the present disclosure may be directed toward a method for handling data based on compressibility of the data. The method may identify a first and second training data stream. The first stream may comprise fully compressed data and the second stream may comprise data that can be further compressed. An ANN may be used to evaluate the training data, generating weights and biases for the ANN, and tagging, as fully compressed and compressible, the data streams, respectively. Once the ANN has been trained, the improved system executing the method may evaluate unclassified data, in order to determine that the data stream should be sent to a data compressor for further compression, or to storage.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1A depicts a diagram of a sample artificial neuron, consistent with embodiments. In embodiments, an artificial neural network (ANN) may be comprised of a number of interconnected artificial neurons.

FIG. 1B depicts a diagram of a sample feed forward artificial neural network (ANN), consistent with embodiments.

FIG. 4 depicts a set of sample training data inputs and response or outputs, according to embodiments.

Figure 2:
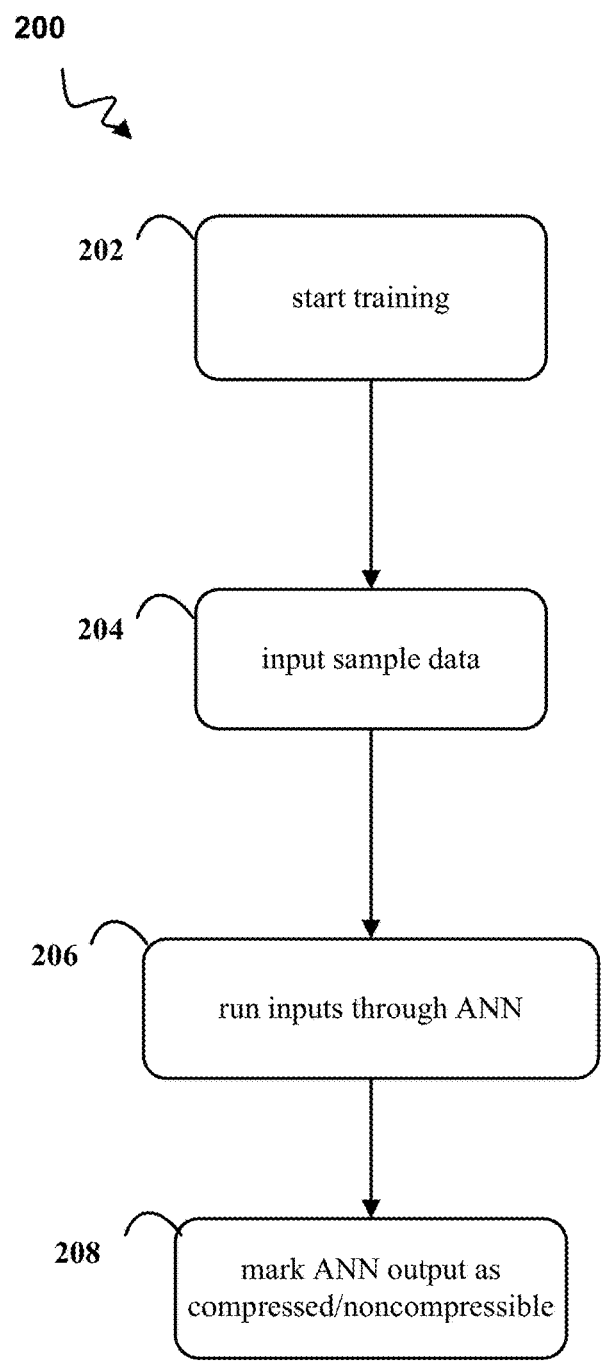
FIG. 2 depicts a flow diagram of a method for training an ANN for data compression detection, consistent with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer learning, more particular aspects relate to computer learning applications to data compression. While the present disclosure is not necessarily limited to such applications, various aspects of the disclosure may be appreciated through a discussion of various examples using this context.

Data compression may allow for a reduction in hardware storage, data transmission time, and communication bandwidth. Thus, data compression may result in cost savings. Data compression may be performed by a software program running on a computer system. The software program may use a formula or algorithm to determine how to shrink the size of the data. For example, an algorithm may represent a string of bits (i.e., 0s or 1s) with a smaller string of 0s and 1s, by using a dictionary for conversion between them. The software program may use a formula that inserts a reference or pointer to a string of 0s and is that the program has already seen. In this way, data may be compressed.

Data compression may be a lossless or lossy process. For example, a file compressed using lossless compression may allow for a restoration of the file to its original state without the loss of a single bit of data when the file is compressed and/or uncompressed. Lossy compression, however, may permanently eliminate bits of data that may have been deemed redundant, unimportant, or imperceptible. As discussed herein, data compression may reduce data transmission time and hardware storage, but it may also result in a performance impact, due to the use of central processing unit (CPU) and memory resources needed to compress and decompress the data.

As indicated above, data compression can often have a significant impact on performance. Data compression may require much CPU usage and memory resources to both compress and decompress the data. Often, much of the data in a data set intended for compression is already compressed, or is not further compressible. For example, jpeg files, mpeg files, and many encrypted files cannot be further compressed, and will thus just be stored without further compression. In these cases, additional in-line compression is either very ineffective or not possible. Thus, attempts to compress segments of data that are not further compressible can be costly, burdensome, and ineffective.

To reduce expensive attempts at compressing already compressed or not further compressible data, a computer system may perform a cognitive high performance pre-analysis of digital data to determine its compressibility (i.e., if the data is further compressible or not). In this way, the computer system can avoid an undue performance impact for data that will not benefit from compression. The computer system may determine the compressibility of a particular data set to be further compressible or not further compressible (i.e., non-compressible). If the computer system determines that the data is non-compressible, subsequent data compression steps may not be performed. In embodiments, the cognitive high performance pre-analysis of the data may occur through the use of a supervised or semi-supervised learning model. The learning model may be, for example, an artificial neural network (ANN), or other trainable learning model.

The system may first build and train the supervised learning model. The model may be built through the use of a set or sets of known sample data. For example, the sample data may be generated using one or more known lossless data compression algorithms, for example the Lempel-Ziv-Welch (LZW) algorithm. Using this known sample data, the model may be developed, including the determination of weighting factors and bias for the model. A computer system using the supervised learning model trained and generated in this way provides an advantage over a more generalized computer system in that it may greatly improve performance, through decreasing an adverse performance impact. The use of the trained supervised learning model may allow for a pre-compression determination of the data, as to whether it will benefit from compression (i.e., further compressible) or would not benefit from compression (i.e., not further compressible, non compressible). Thus, the improved computer system would be able to avoid unnecessary taxation on its CPU usage and memory resources, by circumventing ineffective or unhelpful data compression attempts.

In training of an ANN, the connections within the network can be systematically adjusted based on inputs and outputs. These connections between the nodes or neurons may be assigned numbers called 'weights'. In some literature, these weights may also be referred to as parameters. In training, a randomly selected set of weights may be applied to the first set of inputs (e.g., forward propagation). For example, weights may be applied to each first input (byte) in the set or sets of sample data. Biases, or error, may then be measured based on the output, and the weights may be adjusted accordingly (e.g., back propagation). As new data, for example, the data in the set or sets of sample data, is fed into the neural network, the weights may change (i.e., increase or decrease), and biases may be adjusted based on iterative error evaluation. When a trained network is being used, the synapses take the input and multiply it by the weight or weights to determine the output.

The model may then be tested using the sample data and a set of test data. In this way, the accuracy of the supervised learning model may be verified prior to its use in determining whether or not the data to be processed is further compressible. For example, some data, despite having previously been compressed, may still be responsive to further compression. Other data, however, may be fully compressed, and thus would not benefit from being subjected to further compression attempts. Once the model has been both trained, tested, and verified, a set of unclassified data may be evaluated, as described herein, using the model.

In embodiments, based on the evaluating, a subset of the unclassified data may be determined to be non-compressible, or not further compressible, indicating it need not be sent to a data compressor. This indication could thus allow the identified not further compressible data to bypass processing by the data compressor, improving processing rates, conserving processing power, or both. The subset of not further compressible data may be added directly in storage, for example in memory.

In embodiments, based on the evaluating, the system may determine that a subset of the unclassified data is further compressible (e.g., it is uncompressed or not fully compressed). Responsive to this determination, the system may pass this further compressible subset of data to a data compressor for compression. The system may then choose to store this compressed data, or proceed with some other action.

FIG. 1A depicts a diagram of a sample artificial neuron, consistent with embodiments. In embodiments, an artificial neural network (ANN) may be comprised of a number of interconnected artificial neurons 100. An artificial neuron 100 may be conceptually modeled after a biological cell of the nervous system (neuron). A biological neuron, like an artificial neuron, may exist in a broader interconnected network. The biological neuron may consist of several dendrites, which receive signals from previous neurons at points of connection called synapses. The signals may pass through the cell body and be transferred through a single portion of the cell called a dendrite to the next neuron or neurons. Like the biological cell, the artificial neuron may receive several signal (inputs 104) at points of contact known as synapses. These inputs 104 may be shown by the various arrows converging on the artificial neural cell body 106. Each of these inputs 104 may be multiplied by a particular weight 102 (including W1 102A, W2 102B, W3 102C, W4 102D to Wn 102E). Each of these weights 102 may be analogous to the varying strengths of incoming signals (inputs 104). The weighted inputs 104 may then be processed by one or more mathematical functions, represented at the artificial neural cell body 106, to determine the activation of the cell body. In the artificial neuron, the activation (e.g., activated or not activated) may be represented by an output 108 (e.g., on or off, 1 or 0).

FIG. 1B depicts a diagram of a sample feed forward artificial neural network (ANN), consistent with embodiments. In embodiments, the ANN 116 may be comprised of several interconnected artificial neurons, for example artificial neuron 100 depicted in FIG. 1A. In embodiments, the ANN 116 may comprise several layers comprised of nodes including an input layer 110, a hidden layer 112, and an output layer 114. In embodiments, an ANN may have one or several hidden layers 112. The ANN 116 depicted here may be referred to as a "feed forward" ANN, as the signals (or inputs) are fed at the input layer 110, passed to the hidden layer 112, and to the output layer 114, moving in a single forward direction. Other ANN types may exist.

The ANN depicted here, ANN 116, has a single input layer 110, which comprises binary input of one byte (inputs 1-8). The ANN 116 has a single hidden layer 112 which contains 10 neurons. The output or response layer 114 may provide binary output of either a 1 or 0, with one indicating the data is not further compressible and 0 indicating the data is further compressible.

In embodiments, ANN usage may be divided into three phases: a training phase, a testing and verification phase, and a usage phase. Initially, the ANN may first be trained, then tested and verified, then used. Throughout the use of the model, the system may consistently test and retest the validity of the ANN model. In the event that the model fails a testing and validation iteration, the ANN may be retrained or refined using sample or testing data. Thus, the ANN may be subjected to consistent refinement via a feedback loop, which may use known training data in order to test the accuracy of the ANN throughout the testing process.

FIG. 2 depicts a flow diagram of a method 200 for training an ANN for data compression detection, consistent with embodiments. In embodiments, the ANN may be trained for both non-compressible (i.e., not further compressible) and compressed data. The training may begin at 202. A limited length of binary data may be used as sample data, and may be designated as in input for the ANN, per 204. As described herein, the sample data may be generated using a known algorithm for data compression, including for example, one for lossless data compression. In embodiments, the input data may be fed to a feed forward network like the ANN 116 in FIG. 1B. The input sample binary data may be run through the ANN, per 206. The system may then mark the output of the ANN-evaluated sample data as further compressible (i.e., 0) or not further compressible (i.e., 1), per 208.

Figure 3:
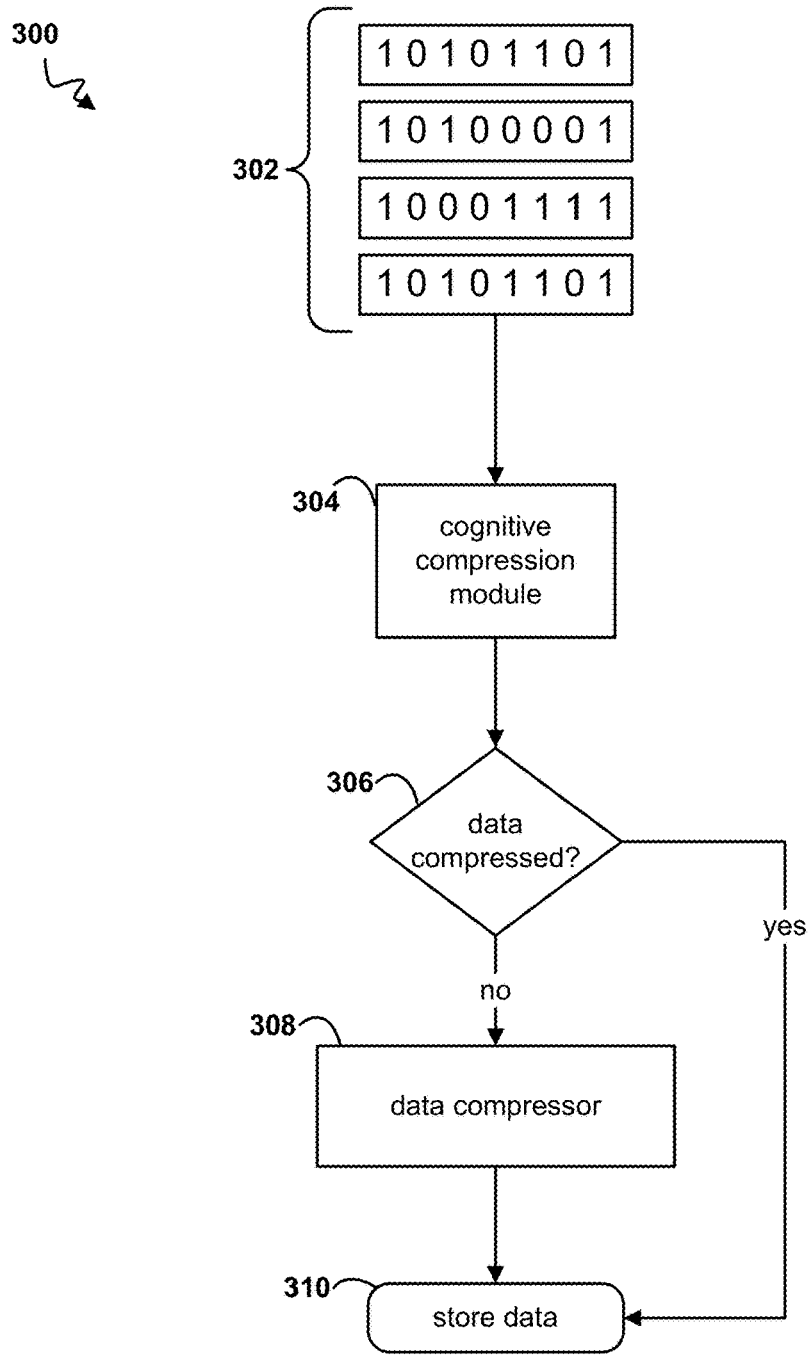
FIG. 3 depicts a system flow diagram of a process for testing incoming data streams using cognitive analysis, consistent with embodiments.

FIG. 3 depicts a system flow diagram of a process 300 for testing incoming data streams using cognitive analysis, consistent with embodiments. In embodiments, the process may use cognitive or deep learning processes, like the ANN described herein, to determine if incoming data is already compressed. The process 300 may allow a system to bypass compression of already compressed data, in order to reduce wasted processing time and resources. The process 300 may begin when binary data 302 is fed to a cognitive compression module 304. In embodiments, the cognitive compression module 304 may be an ANN which has been trained according to the method 200, as pictured in FIG. 2. The cognitive compression module 304 may evaluate the incoming binary data 302 by receiving the data as input, running it through the ANN, and generating an output based on the training. The system may detect whether the cognitive compression module 304 output is tagged as compressed or uncompressed, per 306. If the data is uncompressed, the data may be sent to a data compressor module 308, for compression, and subsequent storage, per 310. If the data is compressed, the data may bypass the data compressor, and instead be stored, per 310, in memory or elsewhere.

FIG. 4 depicts a set of sample training data inputs and response or outputs, according to embodiments. The data 400 may comprise a set of sample data 404 and a set of response data 402. In embodiments, the set of sample data 404 may be generated through the use of a known algorithm, for example, the Lempel-Ziv-Welch algorithm was used to generate the sample data 404. The Lempel-Ziv-Welch is a universal lossless data compression algorithm and it may be used to create the sample data for use in training the ANN (model). The inputs, as indicated at the top row of each of the columns of sample data 404 may correlate with each of the inputs of the ANN depicted at FIG. 1B. The sample data 404 may then be run through the ANN with the depicted responses 402 being output by the ANN (model). In embodiments, the responses 402 may be the output generated by the ANN, for example, the ANN depicted at FIG. 1B.

Figures 5A, 5B:
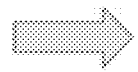
FIG. 5A depicts a set of test data and its corresponding inputs, consistent with embodiments.
FIG. 5B depicts an example set of output data, consistent with embodiments.

FIG. 5A depicts a set of test input data 500A, consistent with embodiments. In embodiments, this set of test data may be used to test an ANN, for example ANN 116 depicted in FIG. 1B. The inputs, as labeled at the top of each column 502, could correspond to each of the inputs at input layer 110 in FIG. 1B. Each row 504 could be one byte of sample data, with the column label indicating the input location for the ANN 116.

FIG. 5B depicts an example set of output data, consistent with embodiments. An example of testing data that may be used in the second phase of the ANN usage model, the testing and verification phase, is depicted at FIG. 5. Once the model has been trained, a set of test data may be used to verify or validate the accuracy of the model (e.g., the determined weights and biases of the model). The outputs 500B depicted here correspond to each of byte of test data, depicted in each row 504 of FIG. 5A. The ANN output for the test data shows a 1, 1, 1, 0, 0, 0. This indicates that the first three bytes fed to the system were not further compressible (as indicated by "1" output), and the final three bytes were further compressible (as indicated by "0" output). The output 500B also shows example numerical results, prior to conversion to binary output. In embodiments, the system may establish an error threshold for the net (numerical) result. The error threshold may be a particular variance from 1 or 0 at which the system converts to a testing mode, as described in FIG. 6.

Figure 6:
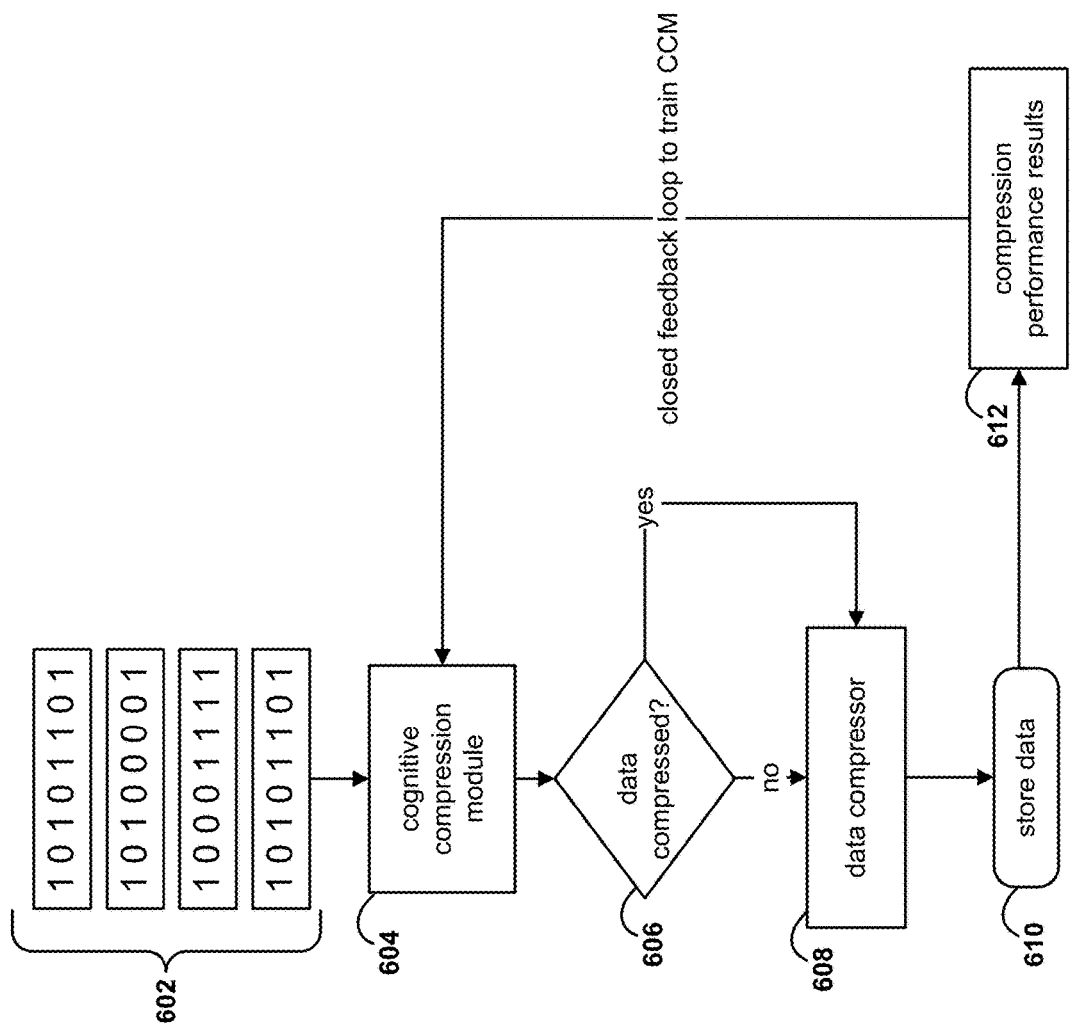
FIG. 6 depicts a process flow for a method of refining an ANN, consistent with embodiments.

FIG. 6 depicts a process flow for a method 600 of refining an ANN, consistent with embodiments. In embodiments, a set of binary data 602 for testing may be input into a cognitive compression module 604. The binary data 602 may be compressed or uncompressed and is fed to the cognitive compression module 604 for testing. In embodiments, the data 602 and cognitive compression module 604 may be similar to those in FIG. 3, with the cognitive compression module 604 comprising an ANN which has been trained and may determine whether the data has already been compressed.

In embodiments, the system may be set to train the module at particular time increments, at a particular point in a processing cycle, after a set number of cycles, based on a user setting, or in another suitable way. When a testing cycle is triggered, the system may still determine whether or not the output from the cognitive compression module 604 indicates that the data is compressed or not, per 606, but regardless of the determination, the data will still be passed to a data compressor, 608, for compression. The data can then be stored, per 610. The data can also be analyzed for performance results, per 612, to identify any discrepancies between ANN-predicted compression and actual compression. If the discrepancies indicate that the ANN (the cognitive compression module) is no longer accurately predicting compression (based on, for example, a predetermined error threshold), then the results can be fed back to the module 604, and they system can be retrained or retested to refine the ANN evaluation.

Figure 7:
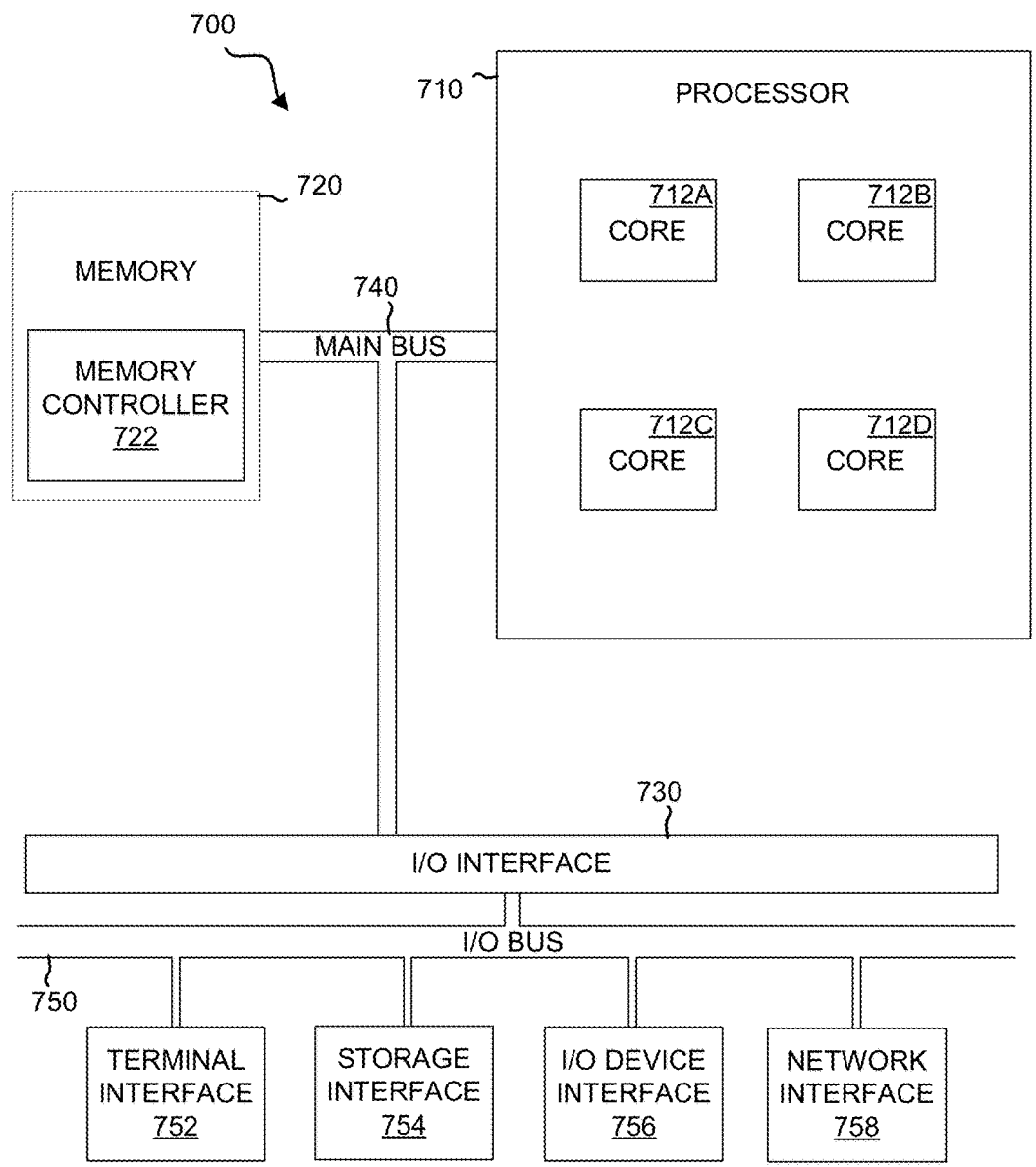
FIG. 7 depicts the representative major components of an example computer system that may be used, according to embodiments.

FIG. 7 depicts the representative major components of an example computer system 700 that may be used, according to embodiments. It is appreciated that individual components may vary in complexity, number, type, and\or configuration. The particular examples disclosed are for example purposes only and are not necessarily the only such variations. The computer system 700 may comprise a processor 710, memory 720, an input/output interface (herein I/O or I/O interface) 730, and a main bus 740. The main bus 740 may provide communication pathways for the other components of the computer system 700. In some embodiments, the main bus 740 may connect to other components such as a specialized digital signal processor (not depicted).

The processor 710 of the computer system 700 may be comprised of one or more cores 712A, 712B, 712C, 712D (collectively 712). The processor 710 may additionally include one or more memory buffers or caches (not depicted) that provide temporary storage of instructions and data for the cores 712. The cores 712 may perform instructions on input provided from the caches or from the memory 720 and output the result to caches or the memory. The cores 712 may be comprised of one or more circuits configured to perform one or more methods consistent with embodiments of the present disclosure. In some embodiments, the computer system 700 may contain multiple processors 710. In some embodiments, the computer system 700 may be a single processor 710 with a singular core 712.

The memory 720 of the computer system 701 may include a memory controller 722. In some embodiments, the memory 720 may comprise a random-access semiconductor memory, storage device, or storage medium (either volatile or non-volatile) for storing data and programs. In some embodiments, the memory may be in the form of modules (e.g., dual in-line memory modules). The memory controller 722 may communicate with the processor 710, facilitating storage and retrieval of information in the memory 720. The memory controller 722 may communicate with the I/O interface 730, facilitating storage and retrieval of input or output in the memory 720.

The I/O interface 730 may comprise an I/O bus 750, a terminal interface 752, a storage interface 754, an I/O device interface 756, and a network interface 758. The I/O interface 730 may connect the main bus 740 to the I/O bus 750. The I/O interface 730 may direct instructions and data from the processor 710 and memory 720 to the various interfaces of the I/O bus 750. The I/O interface 730 may also direct instructions and data from the various interfaces of the I/O bus 750 to the processor 710 and memory 720. The various interfaces may include the terminal interface 752, the storage interface 754, the I/O device interface 756, and the network interface 758. In some embodiments, the various interfaces may include a subset of the aforementioned interfaces (e.g., an embedded computer system in an industrial application may not include the terminal interface 752 and the storage interface 754).

Logic modules throughout the computer system 700—including but not limited to the memory 720, the processor 710, and the I/O interface 730—may communicate failures and changes to one or more components to a hypervisor or operating system (not depicted). The hypervisor or the operating system may allocate the various resources available in the computer system 700 and track the location of data in memory 720 and of processes assigned to various cores 712. In embodiments that combine or rearrange elements, aspects and capabilities of the logic modules may be combined or redistributed. These variations would be apparent to one skilled in the art.

Figure 8:
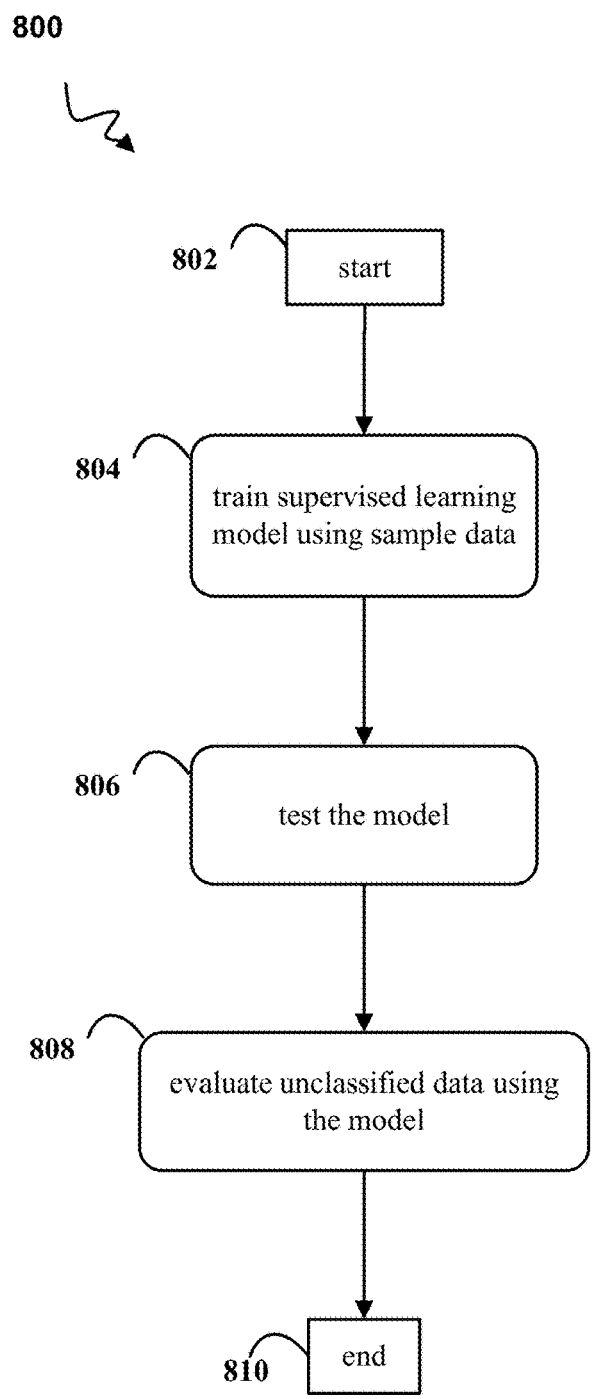
FIG. 8 depicts a flow of a method for using a supervised learning model for classifying data as further compressible or non-compressible, according to embodiments.

FIG. 8 depicts a flow of a method 800 for using a supervised learning model for classifying data as further compressible or non-compressible, according to embodiments. The method 800 may start 802 when a system builds a supervised learning model 804. In embodiments, this supervised learning model may be an ANN. The model may be built using sample data which may have been generated by a known lossless data compression algorithm, or in some other way. The training may include generating weighting factors and bias for the supervised learning model. The system may then test the model, per 806. In embodiments, the model may be tested using a set of test data, wherein the further compressibility of the data is known. The model may then be used to evaluate the unclassified data, per 808. In embodiments, the system may end, per 810, once the data has been classified as further compressible or not further compressible.

In embodiments, the system may use the classifications of the data (e.g., as either further compressible or not further compressible) to determine the next actions for the data. If the data is determined to be not further compressible, the data may bypass a data compression set and instead be stored directly in memory, or handled in some other way that allows it to bypass attempts at further compression. If the data is determined to be further compressible, the system may pass the data to a data compressor, for compression, and then stored.

In embodiments, the supervised learning model may be tested and refined during its use. For example, the system may identify and sort a set of data according to the method 800, and determine that the data is not further compressible. In a testing mode or a testing cycle, the system may then send the data to the data compressor for compression. Following its processing by the data compressor, the system may then detect that the classification was false, for example, if the data subset was further compressed by the data compressor despite being classified as not further compressible. The system may then refine or retrain the model using modified training data, in order to return the model to an accurate classifier.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for creating a model for handling data based on compressibility of the data, the method comprising:
   identifying, by a computer system, a first training data stream input, the first data stream input comprising a sample of fully compressed data;
   identifying, by the computer system, a second training data stream input, the second data stream input comprising a sample of compressible data;
   evaluating, using an artificial neural network (ANN), the first training data stream input and the second training data stream input;
   tagging, as fully compressed, the first training data stream output; and
   tagging, as compressible, the second training data stream output.

2. The method of claim 1, further comprising:
   identifying, following the evaluating of the first and second training data stream inputs and by the computer system, a digital data stream to be compressed by the computer system;
   evaluating, using the ANN, the digital data stream to be compressed by the computer system;
   determining, based on the evaluating, the data in the digital data stream is not further compressible;
   storing the fully compressed digital data in the digital data stream.

3. The method of claim 1, further comprising:
   identifying, following the evaluating of the first and second training data stream inputs and by the computer system, a digital data stream to be compressed by the computer system;
   evaluating, using the ANN, the digital data stream to be compressed by the computer system;
   determining, based on the evaluating, a subset of data in the digital data stream is further compressible data; and
   transmitting, to a data compressor module, the subset of data.

4. The method of claim 1, further comprising:
   identifying, following the evaluating of the first and second training data stream inputs and by the computer system, digital data to be compressed by the computer system;
   evaluating, using the ANN, the digital data to be compressed;
   determining, based on the evaluating, a subset of the digital data is fully compressed;
   transmitting, to a data compressor module and for compression, the subset of fully compressed data;
   determining, based on the fully compressed data from the data compressor module, data compression performance; and
   refining, based on the data compression performance, the ANN evaluating.

5. The method of claim 1, wherein the evaluating using an ANN comprises:
   determining a set of weighting factors describing the ANN;
   applying, to the first training data stream input and the second training data stream input, the set of weighting factors; and
   generating, by the applying, the first training data stream output and the second training data stream output.

6. A computer system for handling data based on compressibility, the system comprising a processor configured to perform a method comprising:
   identifying a first training data stream input, the first data stream input comprising a sample of fully compressed data;
   identifying a second training data stream input, the second data stream input comprising a sample of compressible data;
   evaluating, using an artificial neural network (ANN), the first training data stream input and the second training data stream input;
   tagging, as fully compressed, the first training data stream output; and
   tagging, as compressible, the second training data stream output.

7. The computer system of claim 6, wherein the method performed by the processor further comprises:
   identifying, following the evaluating of the first and second training data stream inputs, a digital data stream to be compressed by a data compressor module;
   evaluating, using the ANN, the digital data stream to be compressed by the data compressor module;
   determining, based on the evaluating, the data in the digital data stream is not further compressible; and
   storing the fully compressed digital data in the digital data stream.

8. The computer system of claim 6, wherein the method performed by the processor further comprises:
   identifying, following the evaluating of the first and second training data stream inputs, a digital data stream to be compressed by a data compressor module;
   evaluating, using the ANN, the digital data stream to be compressed by the data compressor module;
   determining, based on the evaluating, a subset of data in the digital data stream is further compressible data; and
   transmitting, to the data compressor module, the subset of data.

9. The computer system of claim 6, wherein the method performed by the processor further comprises:
   identifying, following the evaluating of the first and second training data stream inputs, digital data to be compressed by a data compressor module;
   evaluating, using the ANN, the digital data to be compressed;
   determining, based on the evaluating, a subset of the digital data is fully compressed;
   transmitting, to the data compressor module and for compression, the subset of fully compressed data;
   determining, based on the fully compressed data from the data compressor module, data compression performance; and
   refining, based on the data compression performance, the ANN evaluating.

10. The computer system of claim 6, wherein the evaluating using an ANN comprises:
    determining a set of weighting factors describing the ANN;
    applying, to the first training data stream input and the second training data stream input, the set of weighting factors; and
    generating, by the applying, the first training data stream output and the second training data stream output.

11. A computer program product for handling data based on compressibility, the computer program product comprising a computer readable storage medium having program instructions embodied therewith, wherein the computer readable storage medium is not a transitory signal per se, the program instructions executable by a processor to cause the processor to perform a method comprising:

identifying a first training data stream input, the first data stream input comprising a sample of fully compressed data;

identifying a second training data stream input, the second data stream input comprising a sample of compressible data;

evaluating, using an artificial neural network (ANN), the first training data stream input and the second training data stream input;

tagging, as fully compressed, the first training data stream output; and tagging, as compressible, the second training data stream output.

12. The computer program product of claim 11, wherein the method further comprises:

identifying, following the evaluating of the first and second training data stream inputs, a digital data stream to be compressed by a data compressor module;

evaluating, using the ANN, the digital data stream to be compressed by the data compressor module;

determining, based on the evaluating, the data in the digital data stream is not further compressible; and storing the fully compressed digital data in the digital data stream.

13. The computer program product of claim 11, wherein the method further comprises:

identifying, following the evaluating of the first and second training data stream inputs, a digital data stream to be compressed by a data compressor module;

evaluating, using the ANN, the digital data stream to be compressed by the data compressor module;

determining, based on the evaluating, a subset of data in the digital data stream is further compressible data; and transmitting, to the data compressor module, the subset of data.

14. The computer program product of claim 11, wherein the method further comprises:

identifying, following the evaluating of the first and second training data stream inputs, digital data to be compressed by a data compressor module;

evaluating, using the ANN, the digital data to be compressed;

determining, based on the evaluating, a subset of the digital data is fully compressed;

transmitting, to the data compressor module and for compression, the subset of fully compressed data;

determining, based on the fully compressed data from the data compressor module, data compression performance; and refining, based on the data compression performance, the ANN evaluating.

15. The computer program product of claim 11, wherein the evaluating using an ANN comprises:

determining a set of weighting factors describing the ANN;

applying, to the first training data stream input and the second training data stream input, the set of weighting factors; and generating, by the applying, the first training data stream output and the second training data stream output.

* * * * *